United States Patent Office 2,757,985
Patented Aug. 7, 1956

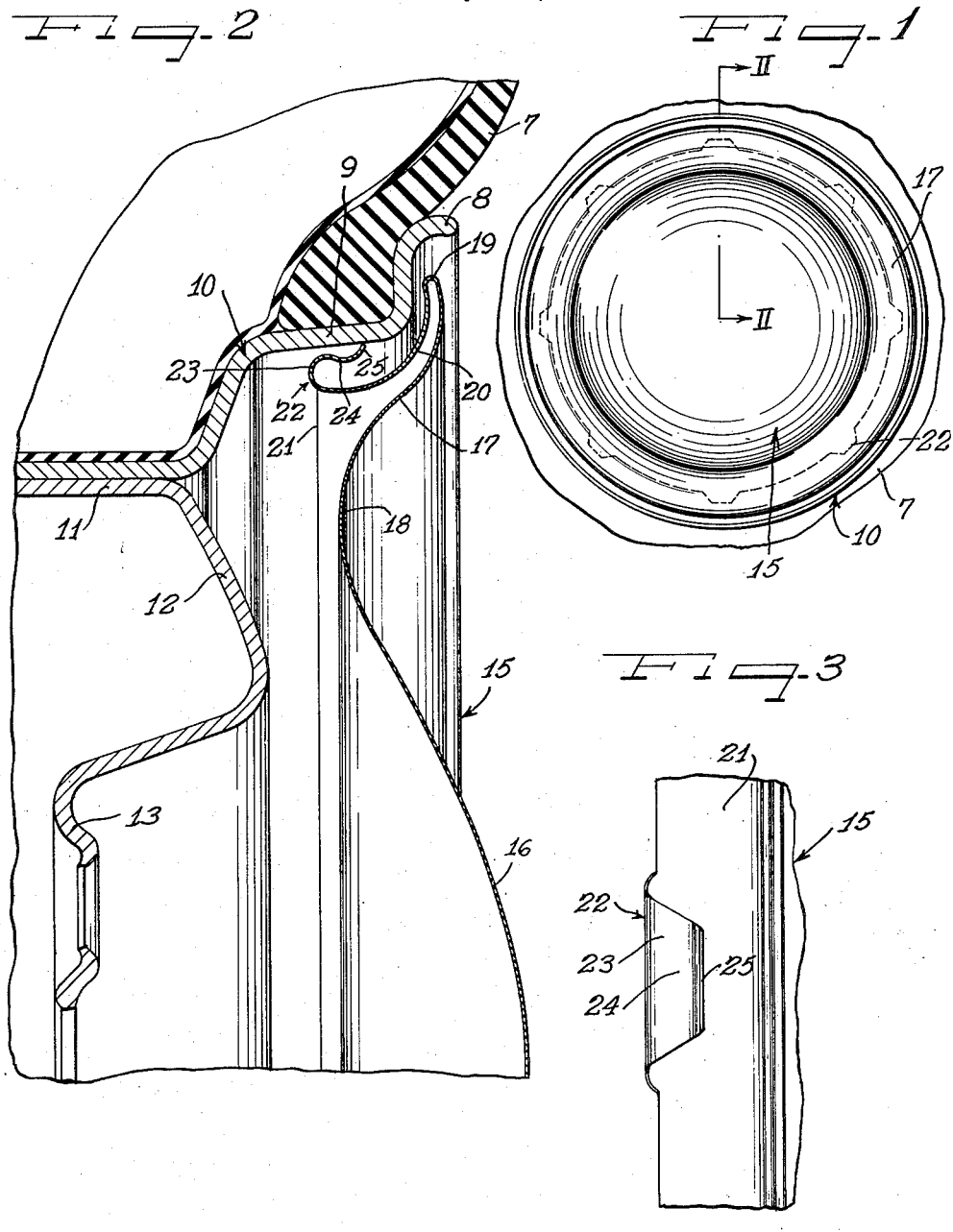

2,757,985
WHEEL COVER
George Albert Lyon, Detroit, Mich.

Application September 23, 1953, Serial No. 381,828

1 Claim. (Cl. 301—37)

This invention relates generally to a wheel cover and more particularly to a wheel cover having integral resilient cover retaining fingers.

An object of this invention is to provide a simplified form of sheet metal wheel cover which lends itself to economical manufacture on a large production basis.

Still another object of this invention is to provide a sheet metal wheel cover with improved integral cover retaining spring fingers on the rearside thereof.

In accordance with the general features of this invention there is provided in a wheel structure including a wheel having a multi-flanged tire rim, a sheet metal circular cover for the wheel having a convexly curved outer margin terminating in an underturned portion following closely on the rearside of the cover the curved contour of the cover margin but spaced therefrom and terminating in an axially rearwardly disposed circular edge portion, and a plurality of spaced cover retaining spring fingers each comprising an integral extension of the edge portion and being bent radially outwardly therefrom into a turned portion leading into a generally axially extending resilient leg overlapping and generally parallel to the edge portion and which, in turn, terminates in an edge for slide-on yieldable gripping engagement with a wheel rim flange.

Other objects and features of this invention may more fully appear from the following detailed description taken in connection with the accompanying drawings which illustrate a single embodiment thereof and in which Figure 1 is a fragmentary side elevation of a wheel structure having my novel cover applied thereto;

Figure 2 is an enlarged fragmentary cross-sectional view taken on substantially the line II—II of Figure 1 looking in the direction indicated by the arrows; and Figure 3 is a fragmentary detail view of one of the cover fingers looking edgewise at the cover.

As shown on the drawings:

The reference character 7 designates generally a conventional pneumatic tire and tube assembly mounted in the customary way upon a standard multi-flanged tire rim 10. This tire rim 10 includes the usual terminal flange 8 and an intermediate axially extending flange 9 within the confines of the wheel.

The tire rim 10 is secured at 11 to a supporting wheel body or load sustaining member comprising a dished stamping 12 including the usual central bolt-on flange 13.

Cooperable with this conventional wheel assembly is a sheet metal cover 15 having incorporated therein the advantageous features of this invention. This cover may be made from any suitable material such, for example, as stainless steel sheet which lends itself to manufacture on a large production basis with any suitable press equipment.

The cover 15 includes a central crown or hub portion 16 and an outer annular divergent portion 17 symmetrically connected to the hub portion 16 by an intermediate curved depressed portion 18.

The outer annular portion or margin 17 of the cover has a turned peripheral edge 19 leading into an underturned portion or flange 20. It will be noted that the outer marginal portion 17 of the cover is convexly curved and that the underturned portion is similarly curved and closely follows the contour of portion 17 on the rearside of the cover but is spaced from the cover. This results in the outer periphery of the cover in effect being corrugated thereby greatly reinforcing the cover in the area of the application of retaining and pry-off forces to the cover.

The underturned convexly curved flange portion 20 of the cover terminates in an axially and rearwardly extending edge portion 21 which is positioned substantially within the confines of rim flange 9 when the cover is on the wheel.

Projecting from this edge portion 21 at spaced intervals and integral therewith are a plurality of resilient cover retaining fingers 22. These retaining fingers may be of any suitable number such, for example, as eight as shown by dotted lines in the construction.

Each finger 22 has a turned or bent portion 23 leading into a slightly inclined leg 24 overlapping edge portion 21 but spaced therefrom. This leg 24 dips slightly toward edge portion 21 and terminates in an angular gripping extremity or edge positioned for sliding engagement with the surface of rim flange 9.

It will be appreciated that the angled extremities or edges 25 of the fingers 22 are normally positioned in a circle of a diameter slightly greater than that of the circular opening defined by rim flange 9 so that the fingers must flex when they enter the wheel. In this manner the fingers are resiliently stressed when they are in gripping engagement with the wheel so that the cover is held in a resilient floating condition on the wheel as shown in Figure 2.

Each finger 22 together with edge portion 21 is generally of a U-shaped cross-sectional shape.

In the application of the cover to the wheel it is first placed over a side of the wheel and is then pushed inwardly toward the wheel resulting in the spring finger legs 24 being resiliently cammed toward the edge portion 21 and into tight gripping engagement with the rim flange 9.

The cover is easily removable from the wheel upon the insertion of a pry-off tool under cover edge 19 and the application of a twisting pry-off force to the cover sufficient to dislodge the fingers 22 progressively from retaining engagement with rim flange 9.

In other words, the resilient yielding of leg 24 of each finger 22, upon the application of a pry-off force to edge 19, will rock the inclined edge 25 out of gripping engagement with inclined rim flange 9, to enable the removal of the cover.

I claim as my invention:

In a wheel structure including a wheel having a multi-flanged tire rim, a sheet metal circular cover for the wheel having a curved outer margin terminating in a rearwardly underturned portion doubled back over the rear side of said margin but spaced therefrom and leading into an axially rearwardly disposed continuous circular flange, and a plurality of spaced cover retaining spring fingers curvingly doubled back over said flange in spaced relation thereto, each comprising an integral extension of said flange and being bent radially outwardly therefrom into a turned portion leading into a substantially generally axially extending resilient leg overlapping and generally parallel to but closely spaced to said flange and which terminates in an angled short relatively stiff terminal edge for slide-on yieldable and detachable gripping engagement with a wheel rim flange, said leg being yieldable toward said cover flange in the space therebetween, when said angled edge engages said rim flange, to tension said edge in its gripping of said rim flange.

References Cited in the file of this patent

UNITED STATES PATENTS

| Re. 19,467 | Lyon | Feb. 12, 1935 |
| 2,574,491 | Lyon | Nov. 13, 1951 |
| 2,607,633 | Lyon | Aug. 19, 1952 |
| 2,669,487 | Horn | Feb. 16, 1954 |